MAGNETIC A/D ENCODER AND METHOD OF PRODUCING SAME

Filed Jan. 6, 1965

INVENTOR.
NORMAN J. BOSE
BY [signature]
ATTORNEY

United States Patent Office 3,453,614
Patented July 1, 1969

3,453,614
MAGNETIC A/D ENCODER AND METHOD OF PRODUCING SAME

Norman J. Bose, 12536 Huston St., North Hollywood, Calif. 91604

Filed Jan. 6, 1965, Ser. No. 423,675
Int. Cl. H03k 13/18; H04l 3/00; G11b 5/84
U.S. Cl. 340—347 4 Claims

ABSTRACT OF THE DISCLOSURE

A magnetic shaft rotation-to-digital encoder using barium ferrite disks which are selectively and permanently magnetized with a binary code on all surfaces by application of a high DC current flux applied by a thin probe to concentrate the flux at the disk surface to be magnetized and a large area flux return element at the opposite surface to fan out and reduce flux density so that magnetized segments on that surface will not be affected. The tracks on both surfaces of a disk are staggered on different radii to reduce flux interaction between magnetized segments on opposite surfaces, and accessory concentric magnetized tracks between the digit tracks will straighten the digit track flux for improved resolution.

The invention relates to analog-to-digital encoders, and more particularly to a novel and improved magnetic encoder disk and a method of producing therein magnetic elements having improved magnetic characteristics.

Analog-to-digital encoders are presently being extensively used to translate analog information, such as a mechanical position or a shaft rotation, into digital information that is accepted and operated upon by a digital computer. The traditional shaft rotation to digital encoder consists of an input shaft to which is coupled an information member which is generally in the form of disk which contains on its surface a plurality of electrically conductive commutator segments arranged in some form of digital pattern. A small voltage is applied to the conductive segments and stationary brushes which contact these segments and receive an electrical digitally coded indication of the position of the input shaft and the information member.

One inherent problem encountered with the brush contact encoders is that continued operation will eventually produce wear of the brushes and the commutator disk. At first, this wear will produce noise in the output and eventually the encoder will become unreadable and useless.

In order to overcome the relatively short life of the brush contact encoder, many types of noncontact encoders have been developed. One of these noncontact encoders is the magnetic analog-to-digital encoder, in which magnetic sensors are positioned close to the surface of a rotatable input information member. The member is provided with a digital code in the form of concentric tracks of selectively placed discrete magnetic elements, each of which produce a magnetic flux field which is detected by the magnetic sensor.

The principal difficulty experienced with magnetic encoders is the undesirable linkage of magnetic flux from one magnetic element into the magnetic sensor associated with other magnetic elements. When this undesirable interlinking occurs, the magnetic sensors are unable to get a clearly defined output signal and are thus unable to accurately translate a mechanical analog position into the required digital code. It has, therefore, been found necessary to isolate the flux fields by physically separating the coded concentric tracks of magnetic elements as widely as possible so that the flux field generated by each element will remain in close proximity to its element and will not become linked with the magnetic sensors associated with other elements. Because of this necessity for separating the magnetic flux fields, the number of tracks that can be magnetized on an encoder disk is severely limited and must be spaced from each other by an amount that is sufficient to prevent flux interlinkage. Also, in order to cause the sensor to be more sensitive to the desired track and less sensitive to adjacent magnetic fields, it has been necessary to position the sensor extremely close to the disk. This in turn has created serious problems of track damages from even slight shocks, vibration, etc.

Briefly described, the present invention comprises a magnetic analog-to-digital encoder information disk in which the individual segments of each concentric track on the disk are magnetized in a particular magnetic pattern to a predetermined depth into the surface of the disk material and a method of producing these segments. Such depth and pattern control permits the use of concentric tracks on each side of a relatively thin disk member and when properly polarized, assures the elimination of signal cross talk caused by magnetic flux interlinkages between magnetic segments and the magnetic sensors associated with other segments.

One object of the invention, therefore, is to provide a magnetic encoder disk capable of being magnetized on each surface thereby increasing the capacity of the encoder.

Another object of the invention is to provide a magnetic encoder disk with improved readout resolution in which the magnetized segments on the two surfaces of the disk will not interlace with the flux from adjacent segments and with the magnetic sensors associated with adjacent segments.

In the drawings which illustrate embodiments of the invention,

Figure 2:
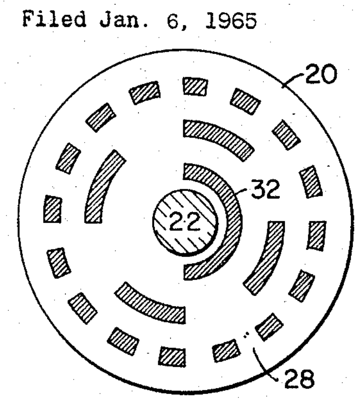
FIGURE 2 is a schematic surface view of the disk taken along the lines 2—2 of FIGURE 1 showing a view of typical binary code on one surface of the disk with the magnetized segments shown as being crosshatched.
Figure 1:
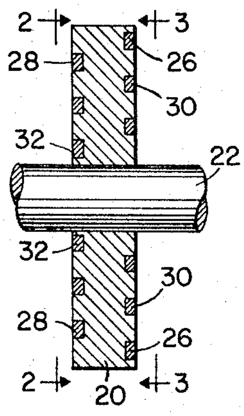
FIGURE 1 is a schematic drawing in section of a magnetic encoder disk having three tracks of magnetic information on each surface.
Figure 3:
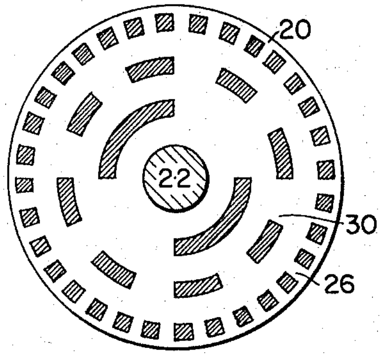
FIGURE 3 is a schematic surface view of the disk taken along the lines 3—3 of FIGURE 1, showing a view of tracks of magnetic segments on the opposite surface.

Turning now to a detailed description of the invention and of the specific embodiments, FIGURE 1 illustrates the cross section of a typical encoder disk 20, the two surfaces of which are illustrated in FIGURES 2 and 3. Encoder disk 20 is mounted upon an input shaft 22 which rotates disk 20 from some external source. Disk 20 is preferably made of commercially available grain oriented barium ferrite sintered ceramic which is a hard, brittle, nonconductive ceramic having an extremely high magnetic coercivity. Because of this high coercivity, a high density magnetic flux may be applied from some external source to permanently magnetize portions of the barium ferrite.

Disk 20 contains on each side of its two surfaces a plurality of magnetic elements arranged in concentric tracks 26, 28, 30, 32. While it is apparent that magnetic elements in a homogeneous material are not visible, the magnetic elements forming the segments in the concentric tracks are shown in FIGURES 1–3 as shaded segments. The magnetic segments in the concentric tracks may be formed into any suitable digital code and, in the embodiment illustrated in FIGURES 2 and 3, a traditional binary code is shown with the odd digit tracks being on the surface of FIGURE 3 and the even digit tracks being on the surface of FIGURE 2; that is, the first or least significant digit track 26 of the disk of FIGURE 3 is the outermost track, the second digit track 28 is the outermost track in FIGURE 2, the third digit track 30 is adjacent the least significant digit track 26 in FIGURE 3, and so on to the sixth or most significant digit track 32 in FIGURE 2. In accordance with the invention, it is entirely possible to magnetize one track on one surface of encoder disk 20 and another track of the opposite surface and upon the same diameter as the first track; that is, concentric tracks 26 and 28 may be aligned back to back. It has been discovered, however, that superior results are obtained when concentric tracks on one surface of disk 20 are staggered with concentric tracks on the other surface; that is, tracks 28 may be staggered between tracks 26 and 30 in FIGURE 1.

The magnetization of discrete elements on one surface of a barium ferrite ceramic disk is well known in the art. However, the magnetization of discrete elements on each side of a relatively thin barium ferrite ceramic disk has heretofore been extremely difficult, if not impossible, because of two important factors. The first is that, if all of the magnetic elements forming the segments in all tracks are to have an identical polarity at the surface of the disk, the magnetization process of the elements on one surface will tend to demagnetize the elements that have been previously magnetized on the opposite surface. The second factor is that, if elements on one surface are to be polarized opposite to those on the opposite surface, a serious magnetic flux interaction between the track segments on each surface will result in erratic and uneven magnetization.

Figure 4:
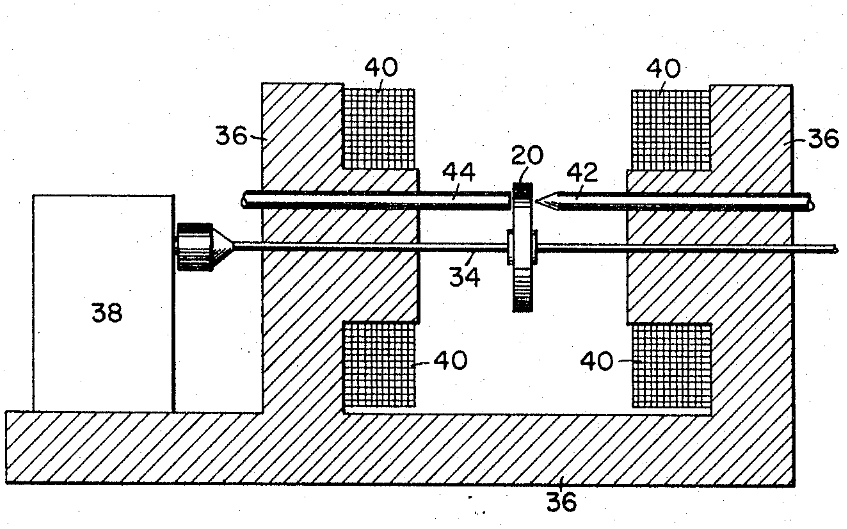
FIGURE 4 is a section drawing of the magnetizing element used to apply the magnetic segments to the surface of a disk.

In the embodiment shown in FIGURES 1, 2 and 3, all magnetic segments are identically polarized; that is, all segments are magnetized so that all north poles of all segments in all tracks are located upon the surface of disk 20 and all south poles are located beneath the surface toward the center of disk 20. Magnetization of the segments may be accomplished with the equipment illustrated in FIGURE 4. In FIGURE 4 a barium ferrite disk 20 is suspended on a shaft 34 of a nonmagnetic material, such as aluminum. Nonmagnetic shaft 34 is suspended in a yoke 36, which may be made of soft iron. Connected to nonmagnetic shaft 34 which extends through yoke 36 is a dividing head 38 which is used to accurately rotate shaft 34 and disk 20 to permanently magnetize the track segments to their required length. Excitation coils 40 mounted upon the arms of yoke 36 will, when excited with a DC current, produce an intense magnetic flux field through yoke 36, magnetizing probe 42, encoder disk 20 and flux return rod 44.

As previously noted, grain oriented barium ferrite ceramic disks are commercially available. The barium ferrite required for disk 20 is thus anistropic with the minute crystals forming the material aligned normal to the surface of the disk so that a sufficiently intense magnetizing flux in a path normal to the disk surface will permanently magnetize the crystals whereas the same flux in some other path will not readily magnetize the crystals.

Figure 5:
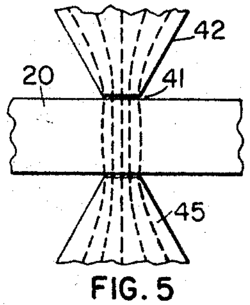
FIGURE 5, 6 and 7 are drawings illustrating the flux patterns during the magnetizing process and the effects caused by magnetizing probes of varying sizes.

In order to accomplish the magnetization of segments only at the surface of disk 20, the physical configuration of the tip of magnetizing probe 42 and return rod 44 is of major importance. In FIGURE 5 tip 41 of probe 42 and the face of flux return rod 45 are shown to be approximately identical in size. Magnetic flux passing through tip 41 and through disk 20 into the face of return rod 45 will be approximately collimated along the oriented grain structure of the disk material and, if the magnetic intensity and flux density is sufficient to completely magnetize any portion of disk 20, the collimated flux path will magnetize completely through disk 20, resulting in a north pole on one surface and south pole on the other surface of disk 20.

Figure 6:
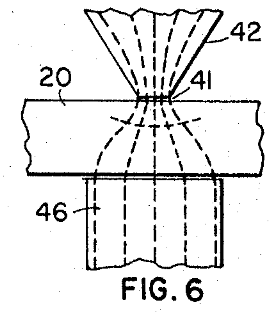

In order to magnetize an element only on the surface of disk 20, the size of the face of flux return rod 46 must be increased, as shown in FIGURE 6. Here, tip 41 of magnetic probe 42 condenses the flux path at the surface of disk 20. This results in a magnetic field of a high flux density and, if the magnetic intensity is sufficient, a permanently magnetized element will be formed at that surface. Because the face of return rod 46 has a greater area than probe 42, flux which has been condensed at the surface by tip 41 will fan out as it approaches the face of return rod 44 and is bent away from the axes of the oriented crystals of the disk material. This results in the lower flux density as the flux pattern approaches rod 46 and a consequent absence of complete magnetization through disk 20.

Figure 7:
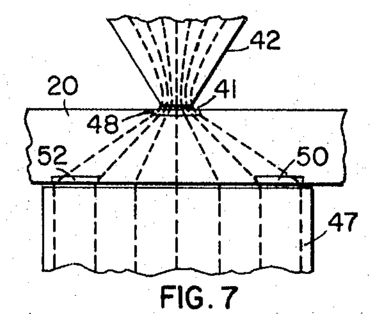

FIGURE 7 shows a still larger face on return rod 47 which results in a more complete fanning out of the flux as it passes from probe tip 41 through disk 20 and into the face of flux return rod 47. Because the flux is concentrated only at the surface of disk 20 adjacent probe tip 41, only a thin element 48 will become completely magnetized. If magnetic elements 50 and 52 have previously been magnetized upon the opposite surface of disk 20, the flux generated in the magnetization process for element 48 passing through disk 20 is of such a low density and is so misaligned with the grain orientation in elements 50 and 52 that previously magnetized elements 50 and 52 will remain substantially undisturbed. It can thus be seen that magnetic elements may be formed only upon the surfaces of encoder disk 20. As an example, assume that magnetic probe 42 has a square tip 41 of .030 inch, the face of flux return rod 47 has a .400 inch square surface, and encoder disk 20 is 100 inches thick. If excitation coils 40 of FIGURE 4 produces a flux density in the order of 6500 lines per square inch, the magnetic elements on the two surfaces of disk 20 will be permanently magnetized to a depth of approximately .020 inch.

Figure 8:
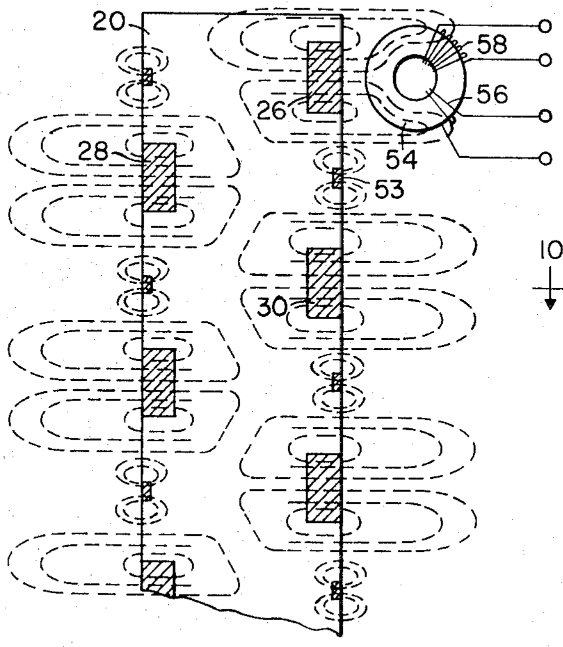
FIGURE 8 is a drawing showing a typical flux configuration in a disk and its action upon a magnetic sensor.

FIGURE 8 illustrates the cross section of disk 20 showing magnetic elements and the approximate flux pattern associated therewith. To detect the presence of magnetic flux on the surface of disk 20, a saturable magnetic toroidal core 54, which is provided with an interrogation winding 56 and an output winding 58 is positioned so that as disk 20 rotates, the flux associated with the various magnetic segments in each track of the disk will become linked with core 54. When core 54 is adjacent a magnetic segment, the flux surrounding that element will saturate core 54; therefore, when an AC interrogation signal is introduced to winding 56, the core being saturated, will prevent the interrogation signal from appearing at output winding 58. On the other hand, if core 54 is not in a magnetic flux field, an interrogation signal introduced into winding 56 will be induced through the unsaturated core 54 into the output winding 58.

It is apparent that, to achieve high readout resolution, it is necessary that the flux pattern from a magnetic segment emanates at right angles to the disk surface and also be confined as closely as possible to its particular magnetic segment without "straying" toward magnetic segments in adjacent tracks on the disk. This straightening and aligning of the flux paths can be accomplished by the use of a magnetized accessory isolation track 53, shown in FIGURE 8. Accessory isolation track 53 is a thin narrow concentric track that is uncoded and forms a continuous magnetic concentric band between the coded segments in adjacent tracks 26 and 30. The accessory isolation track 53 is magnetized with the same polarity as its adjacent tracks 26 and 30 and its purpose is to erect a small local magnetic field that will force the flux paths associated with the adjacent coded tracks 26 and 30 toward their respective magnetic segment. This results in the desired straightening and aligning of the flux in the coded tracks 26 and 30 and improves readout resolutions. Although accessory isolation track 53 has only been described as being inserted between coded tracks 26 and 30, similar accessory isolation may be tracks desirable between all of the coded tracks on both surface of encoder disk 20.

Because of the advantages of using magnetized accessory isolation tracks and also because the strong flux fields from coded magnetic tracks may be detected on the opposite side of a relatively thin disk, it has been found that superior results are obtained if the magnetically coded concentric tracks on one surface of disk 20 are staggered with the coded tracks on the opposite surface of disk 20. Thus, as shown in FIGURE 8, if coded concentric track 28 is positioned on a radius midway between coded tracks 26 and 30, it can be seen that the flux patterns of all magnetized segments, being of the same polarity, tend to avoid adjacent flux patterns and also tend to prevent flux associated with magnetic segments on one surface of the disk from reaching the opposite surface of the disk. This results in a great reduction of undesirable flux interlinkage and in improved readout resolution.

Figure 9:
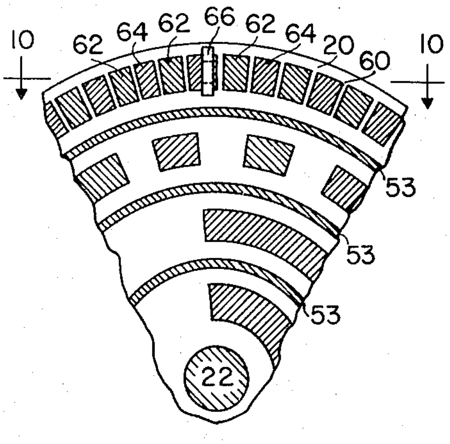
FIGURE 9 is a partial plan view of a track especially suitable as a least significant digit track of an encoder.
Figure 10:
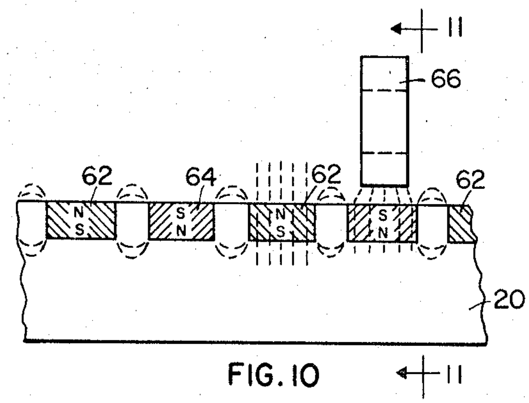
FIGURE 10 is a sectional end view taken along the lines 10—10 of FIGURE 9 showing a typical configuration of the magnetic segments and the flux interlinkage between them.

A magnetic sensing core must be of a relatively thin material. It can be seen by referring to FIGURE 3 that the material of the core must be appreciably thinner than the radial length of a magnetic segment in track 26, so that the core may accurately detect those portions of track 26 which have not been magnetized. If it becomes necessary to detect magnetic segments and nonmagnetic segments which are thinner than the material in the magnetic core, the magnetically coded track illustrated in FIGURE 9 may be used. In FIGURE 9, magnetic disk 20 is provided with a track 60 which contains a plurality of very closely spaced magnetic segments 62 and 64 especially suitable for a least significant digit track. By the process disclosed herein, segments 62 are magnetically polarized opposite to that of segments 64 and are closely spaced with a small nonmagnetized segment therebetween. Because magnetic segments 62 and 64 are oppositely polarized, there is a strong "short circuit" flux field linking adjacent segments, as shown in FIGURE 10. Because this strong flux field is concentrated very near to the surface of disk 20, and because magnetic core 66 is positioned at right angles to and above the flux path, core 66 receives very little of this flux and does not become saturated.

Figure 11:
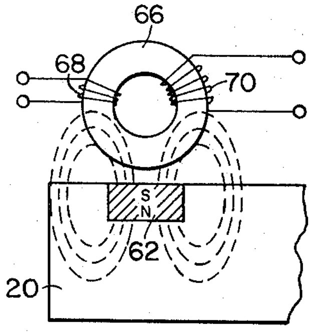
FIGURE 11 is a sectional view taken along the lines 11—11 of FIGURE 10 and shows the operation of the flux path upon a magnetic sensor.

FIGURE 11, on the other hand, shows that in addition to the strong flux linkage between segments 62 and 64, there is a strong flux field surrounding each individual magnetic segment and at right angles to the strong interlinking flux field. This surrounding flux field, being in a plane parallel to the plane of magnetic core 66 will interlink with core 66, causing saturation only when core 66 is adjacent either magnetic segment 62 or 64. Thus, when an AC signal is introduced to interrogation winding 68, the signal will not be induced through saturated core 66 to the output winding 70.

In the event that very small diameter disks are desired, such as are required in a size 11 or size 8 encoder, it may be advantageous to place the least significant digit track ona separate disk or upon one surface of a disk which contains a plurality of concentric more significant tracks on the opposite surface. The placing of particular tracks on particular disks and the spacing of the concentric tracks on a separate disk or upon one surface of a disk which eters of the particular disks and upon the physical space required to position the particular magnetic sensing cores adjacent the disk surfaces. It is to be realized that this specification has described particular embodiments to explain the invention and that variations may be made without departing from the spirit of the invention.

Figure 12:
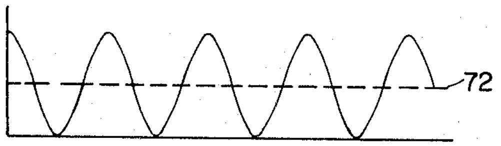
FIGURE 12 is a drawing of the typical output voltage signal from a magnetic sensor as it passes over the magnetic segments, as shown in FIGURE 10.
Figure 13:
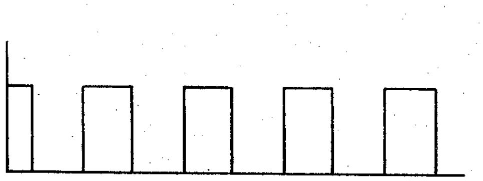
FIGURE 13 illustrates the typical output waveform of FIGURE 12 after having been processed by suitable electronic circuitry.

FIGURE 12 illustrates a typical output signal from output winding 70 as the encoder disk 20 passes beneath magnetic core 66. When core 66 is adjacent the center of magnetic segment, the output signal appearing at output winding 70 is zero, since the interrogating signal cannot be induced to the saturated core. When core 66 is adjacent a midpoint between magnetic segments the output signal is a maximum, indicating that a maximum signal has been induced to the unsaturated core from interrogation winding 68 to output winding 70. This output signal can then be operated upon by subsequent circuitry, not shown, to provide a digital indication of the position of encoder disk 20. For example, by the application of a threshold voltage 72 and subsequent flip-flop circuits, the output waveform of FIGURE 12 may be resolved into a square wave output, as shown in FIGURE 13, in which the lengths of the "on" segments may be made to be identical with the lengths of the "off" segments.

I claim:

1. A magnetic analog-to-digital encoder disk comprising:

(A) a rotatable coded information disk of grain oriented anisotropic barium ferrite ceramic;

(B) a concentric least significant digit track on the first surface of said disk, said least significant digit track comprising:

(a) a plurality of magnetized segments, (b) each of said segments being separated from adjacent segments by a nonmagnetic segment, (c) each of said segments being of a polarity opposite to that of adjacent magnetized segments in said track, (C) a plurality of first magnetized segments arranged in a plurality of odd digit concentric tracks on the first surface of said disk, said segments being identically polarized;

(D) a plurality of second magnetized segments arranged in a plurality of even digit concentric tracks on the second surface of said disk, said second magnetic segments being identically polarized with each other and with said first magnetic segments;

(E) said segments in said least significant digit track and in said odd digit track and said even digit track forming a particular binary digital code;

(F) a plurality of concentric accessory tracks disposed between said least significant digit tracks and said odd digit tracks and between said even digit tracks, said accessory track being continuously magnetized at the same polarity as said first and second magnetic segments in the said odd and said even digit tracks; and (G) said least significant digit track, said first and said second magnetized segments, and said accessory track being formed in said barium ferrite ceramic disk by a magnetizing flux selectively applied to the surface of said disk.

2. A magnetic analog-to-digital encoder disk comprising:

(A) a magnetizable rotatable information disk;

(B) a plurality of first magnetized segments arranged in a plurality of odd digit concentric tracks on the first surface of said disk, said segments being identically polarized;

(C) a plurality of second magnetized segments arranged in a plurality of even digit concentric tracks on the second surface of said disk, said second magnetized segments being identically polarized with each other and with said first magnetized segments;

(D) said odd digit concentric tracks and said even digit concentric tracks forming a particular binary digital code;

(E) a plurality of concentric accessory tracks disposed between said odd digit tracks on said first surface of said disk and between said even digit tracks on said second surface of said disk, said accessory tracks being continuously magnetized at the same polarity as said first and second magnetic segments in said odd and said even digit tracks; and (F) said first and said second magnetized segments and said accessory tracks being formed in said disk by a magnetizing flux selectively applied to the surfaces of said disk.

3. A magnetic analog-to-digital encoder disk in accordance with claim 6 wherein the diameters of said concentric accessory tracks on said first surface are substantially identical to the diameters of said even digit concentric tracks on said second surface, and the diameters of said concentric accessory tracks on said second surface are substantially identical to the diameters of said odd digit concentric tracks on said first surface.

4. In a magnetic analog-to-digital encoder:

a selectively magnetizable rotatable coded information disk having first and second surfaces on opposite faces thereof;

a first plurality of concentric tracks on said first surface of said disk, each track of said first plurality containing a plurality of alternate magnetized and non-magnetized segments;

a second plurality of concentric tracks on said second surface of said disk, each track of said second plurality containing a plurality of alternate magnetized and non-magnetized segments;

each track of said first and said second plurality of tracks representing a digit in a particular binary code; and each track of said first and said second plurality of tracks being located on a different radius on said disk for reducing flux interaction between magetized segments on said first surface of said disk and magnetized segments on said second surface of said disk.

References Cited

UNITED STATES PATENTS

| | | | |
|---|---|---|---|
| 3,113,300 | 12/1963 | Sullivan | 340—347 |
| 3,152,225 | 10/1964 | Peters | 179—100.2 |
| 3,170,154 | 2/1965 | Fleming | 340—347 |
| 3,192,521 | 6/1965 | Sullivan | 340—347 |

MAYNARD R. WILBUR, *Primary Examiner.*

G. R. EDWARDS, *Assistant Examiner.*

PO-1050
(5/69)

UNITED STATES PATENT OFFICE
CERTIFICATE OF CORRECTION

Patent No. 3,453,614 Dated July 1, 1969

Inventor(s) Norman J. Bose

It is certified that error appears in the above-identified patent and that said Letters Patent are hereby corrected as shown below:

3,453,614
MAGNETIC A/D ENCODER AND METHOD OF
PRODUCING SAME
Norman J. Bose, North Hollywood,
Calif., assignor to
Singer-General Precision, Inc.,
a corporation of Delaware
Filed Jan. 6, 1965, Ser. No. 423,675
Int. Cl. H03k 13/18; H041 3/00; G11b 5/84
U.S. Cl. 340-347 4 Claims

---

SIGNED AND
SEALED
FEB 17 1970

(SEAL)
Attest:

Edward M. Fletcher, Jr.
Attesting Officer

WILLIAM E. SCHUYLER, JR.
Commissioner of Patents